US012783852B2

(12) United States Patent
Waniek et al.

(10) Patent No.: US 12,783,852 B2
(45) Date of Patent: Nov. 3, 2026

(54) METHOD AND DEVICE FOR CALIBRATING AND OPERATING A SENSOR COMPONENT WITH THE AID OF MACHINE LEARNING METHODS

(71) Applicant: Robert Bosch GmbH, Stuttgart (DE)

(72) Inventors: Nicolai Waniek, Dornstadt (DE); Felix Michael Stuerner, Ulm (DE); Riccardo Cipolletti, Geislingen an der Steige (DE)

(73) Assignee: Robert Bosch GmbH, Stuttgart (DE)

( * ) Notice: Subject to any disclaimer, the term of this patent is extended or adjusted under 35 U.S.C. 154(b) by 946 days.

(21) Appl. No.: 18/006,398

(22) PCT Filed: Jul. 22, 2021

(86) PCT No.: PCT/EP2021/070569
§ 371 (c)(1),
(2) Date: Jan. 23, 2023

(87) PCT Pub. No.: WO2022/023174
PCT Pub. Date: Feb. 3, 2022

(65) Prior Publication Data

US 2023/0297814 A1 Sep. 21, 2023

(30) Foreign Application Priority Data

Jul. 28, 2020 (DE) ..................... 10 2020 209 481.0

(51) Int. Cl.
*G06N 3/0455* (2023.01)
*G01D 3/02* (2006.01)
*G01D 18/00* (2006.01)

(52) U.S. Cl.
CPC ........... *G06N 3/0455* (2023.01); *G01D 3/022* (2013.01); *G01D 18/00* (2013.01); *G01D 18/008* (2013.01)

(58) Field of Classification Search
CPC .... G06N 3/0455; G01D 18/008; G01D 3/022; G01D 18/00
See application file for complete search history.

(56) References Cited

U.S. PATENT DOCUMENTS 5,554,273 A * 9/1996 Demmin ............ G01N 27/4163 204/406
5,559,431 A * 9/1996 Sellen .................. G01D 18/008 324/225
(Continued)

FOREIGN PATENT DOCUMENTS

CN 101103260 A 1/2008
CN 102087311 A 6/2011
(Continued)

OTHER PUBLICATIONS

Gu, Jingjing, et al. "Dynamic measurement and data calibration for aerial mobile IoT." IEEE Internet of Things Journal 7.6 (2020): 5210-5219. (Year: 2020).*
(Continued)

*Primary Examiner* — Andrew L Tank
(74) *Attorney, Agent, or Firm* — Maginot, Moore & Beck LLP

(57) ABSTRACT

The disclosure relates to a method for calibrating a sensor component with a calibration model, said method comprising: applying an acting physical variable and at least one disturbance variable to the sensor component; and acquiring training data sets at a plurality of evaluation times, wherein a training data set at each evaluation time is acquired by: providing a value for the physical variable acting on the sensor component and a corresponding desired sensor variable, which is intended to represent the value of the physical variable acting on the component; acquiring an electrical measured variable representing the physical variable; acquiring the at least one disturbance variable; and training
(Continued)

the calibration model with the training data sets so that said model maps the at least one disturbance variable to calibration parameters, wherein a difference between the desired sensor variable and the sensor variable is used as a loss function.

12 Claims, 2 Drawing Sheets

(56) References Cited

U.S. PATENT DOCUMENTS

| | | | | |
|---|---|---|---|---|
| 8,712,929 | B1 * | 4/2014 | Bickford | G06Q 50/06 700/286 |
| 11,281,293 | B1 * | 3/2022 | Hernández | G06F 3/011 |
| 11,426,080 | B2 * | 8/2022 | Stang | A61B 5/015 |
| 11,445,951 | B2 * | 9/2022 | Ajemba | G06N 5/022 |
| 11,499,999 | B2 * | 11/2022 | Lange | G01D 4/004 |
| 2009/0082985 | A1 * | 3/2009 | Kalinin | G01N 29/449 702/88 |
| 2013/0253870 | A1 | 9/2013 | Agrawal et al. | |
| 2016/0058356 | A1 * | 3/2016 | Raghuram | A61B 5/222 600/483 |
| 2019/0010019 | A1 | 1/2019 | Koushik et al. | |
| 2020/0126669 | A1 * | 4/2020 | Nuernberg | G16H 50/30 |
| 2020/0293032 | A1 * | 9/2020 | Wang | G01R 19/2513 |
| 2021/0064713 | A1 * | 3/2021 | Wang | G06F 3/04847 |
| 2021/0174960 | A1 * | 6/2021 | Gee | A61B 5/7275 |
| 2021/0231709 | A1 * | 7/2021 | Dave | G01R 15/207 |
| 2021/0400778 | A1 * | 12/2021 | Meo | H05B 6/72 |

FOREIGN PATENT DOCUMENTS

| | | | | |
|---|---|---|---|---|
| CN | 111256905 | A | 6/2020 | |
| DE | 199 57 956 | A1 | 6/2001 | |
| DE | 10 2018 216 543 | B3 | 1/2020 | |
| DE | 10 2018 216 843 | A1 | 4/2020 | |
| EP | 2947426 | B1 * | 9/2018 | G01N 33/0036 |
| WO | 2008/028697 | A2 | 3/2008 | |

OTHER PUBLICATIONS

Behl, Madhur, Truong X. Nghiem, and Rahul Mangharam. “Model-iq: Uncertainty propagation from sensing to modeling and control in buildings.” 2014 ACM/IEEE International Conference on Cyber-Physical Systems (ICCPS). IEEE, 2014. (Year: 2014).*

Gafford, Joshua, et al. “Machine learning approaches to environmental disturbance rejection in multi-axis optoelectronic force sensors.” Sensors and Actuators A: Physical 248 (2016): 78-87. (Year: 2016).*

Lee, Hoyeop, Youngju Kim, and Chang Ouk Kim. “A deep learning model for robust wafer fault monitoring with sensor measurement noise.” IEEE Transactions on Semiconductor Manufacturing 30.1 (2016): 23-31. (Year: 2016).*

Zimmerman, Naomi, et al. “A machine learning calibration model using random forests to improve sensor performance for lower-cost air quality monitoring.” Atmospheric Measurement Techniques 11.1 (2018): 291-313. (Year: 2018).*

Hammad, Issam, and Kamal El-Sankary. “Practical considerations for accuracy evaluation in sensor-based machine learning and deep learning.” Sensors 19.16 (2019): 3491. (Year: 2019).*

Swischuk, Renee, and Douglas Allaire. “A machine learning approach to aircraft sensor error detection and correction.” Journal of Computing and Information Science in Engineering 19.4 (2019): 041009. (Year: 2019).*

International Search Report corresponding to PCT Application No. PCT/EP2021/070569, mailed Oct. 10, 2021 (German and English language document) (7 pages).

Burrows et al., “Gradient-based model calibration with proxy-model assistance”, Journal of Hydrology, vol. 533, 2016.

Prokudin et al., “Deep Directional Statistics: Pose Estimation with Uncertainty Quantification”, Springer Nature Switzerland AG 2018.

* cited by examiner

METHOD AND DEVICE FOR CALIBRATING AND OPERATING A SENSOR COMPONENT WITH THE AID OF MACHINE LEARNING METHODS

This application is a 35 U.S.C. § 371 National Stage Application of PCT/EP2021/070569, filed on Jul. 22, 2021, which claims the benefit of priority to Serial No. DE 10 2020 209 481.0, filed on Jul. 28, 2020 in Germany, the disclosures of which are incorporated herein by reference in their entirety.

TECHNICAL FIELD

The disclosure relates to the calibration of sensor components, in particular taking into account disturbance variables acting externally on the sensor component.

BACKGROUND

The measurement of physical variables by means of sensors is subject to increasingly higher precision requirements. Depending on the physical measuring principle used, however, disturbance variables have a considerable influence on the accuracy of the sensor variable.

For example, the use of gyroscopes and acceleration sensors requires high reliability, since, if there is a failure of other systems, emergency functions are executed based on sensor variables of such sensors. For acceleration sensors in particular, a significant increase in drift stability and a significant reduction in the noise of angular rate sensors are required to ensure the safety and comfort of autonomously driving vehicles. This could enable purely inertial navigation even for longer distances with insufficient geoposition recognition (GPS, GLONASS and the like).

To increase the precision of sensor components, a calibration of the sensor component is usually performed. This compensates for minor production-related differences between the sensor components and enables the zero point to be set precisely. Usually, calibration parameters are written into the sensor component for this purpose and convert an electrical measured variable that depends on a physical variable to be measured into a sensor variable that represents the physical variable to be measured.

SUMMARY

According to the disclosure, a method is provided for calibrating a sensor component, as well as a method for operating a sensor component, a device for calibrating a sensor component, and a device for operating a sensor component.

Further embodiments are specified in the disclosure.

According to a first aspect, a method is provided for calibrating a sensor component with a data-based calibration model, wherein the sensor component comprises a measuring transducer for providing an electrical measured variable that depends on a physical variable to which the sensor component is exposed, and at least one disturbance variable sensor for acquiring at least one disturbance variable, comprising the following steps:

- acquiring training data sets at a plurality of evaluation times, having the respective steps of:
- applying a physical variable to the sensor component;
- providing a corresponding desired sensor variable to represent the value of the acting physical variable,
- acquiring an electrical measured variable representing the physical variable and acquiring the at least one disturbance variable with the aid of the sensor component at the relevant evaluation time;
- training the data-based calibration model with the training data sets so that said model maps the at least one disturbance variable to the at least one calibration parameter.

It may be provided that the data-based calibration model is trained with a loss function indicating a difference between the desired sensor variable and the sensor variable resulting from applying the calibration function to the electrical measured variable.

To calibrate a sensor component, calibration parameters are usually determined that are used to convert, in accordance with a predetermined calibration function, an electrical measured variable that results directly from the physical variable to be measured, based on a physical measurement principle, into a sensor variable that best represents the physical variable and is output or provided.

The calibration function can correspond to a transfer function that describes a signal transformation by the overall sensor setup in terms of control engineering. The calibration function may also represent only a part of the transfer function.

For example, the electrical measured variable may correspond to a voltage, a current, or a frequency signal and may be provided as a digital value to be subsequently applied with the calibration parameters by using a calibration function. In the simplest case, the calibration parameters include a factor and an offset to correct for drift and a zero offset of the electrical measured variable with respect to the physical variable being measured. Further calibration parameters can also take dynamic effects into account.

However, the conversion into the electrical measured variable is not only directly dependent on the physical variable to be measured, it is also subject to variable disturbing influences to which the sensor component is exposed, such as ambient temperature, mechanical effects, effects of electromagnetic radiation, effects of electric fields, magnetic field effects and the like.

Such disturbance variables can be acquired by further sensor elements in the sensor components and taken into account when determining and using the calibration parameters. For example, an acceleration sensor can be provided with a temperature sensor and a magnetic field sensor for the detection of magnetic fields, and can acquire corresponding disturbance variables.

While compensation of the drift and the zero point is sufficient for calibration of the sensor component when there are constant disturbing influences, when there are variable disturbance variables calibration can only be done with reduced sensor accuracy.

Since the influence of the disturbance variables on the sensor quality is often not precisely known, it is proposed to determine the calibration parameters using a data-based calibration model. The data-based calibration model acquires the disturbance variables acquired in the sensor component and assigns suitable calibration parameters to them. The calibration parameters are then used according to a predetermined calibration function to apply to the electrical measured variable, thereby obtaining the sensor variable.

Further, the calibration model can map the electrical measured variable to the at least one calibration parameter in addition to the at least one disturbance variable.

The at least one calibration parameter can be configured to parameterize a calibration function to be applied to the electrical measured variable in order to provide the sensor variable.

In particular, the data-based calibration model can be formed with a neural network, with a probabilistic regression model, with a Bayesian neural network, or with a variational autoencoder.

Thus, non-trivial correlations can be mapped, especially if multiple disturbance variables interacting with the measured variable, such as temperature and magnetic field, are present. In addition, if there is a disturbance variable that influences noise of the electrical measured variable, it can be completely eliminated at certain frequencies by the calibration parameters, if necessary. In particular, this can be done by suppressing noise frequencies by adjusting the calibration function.

In particular, a data-based calibration model that is trained to calibrate the sensor component individually can be used for the determination. This allows simultaneous calibration of a large number of sensor components, wherein the calibration model is trained individually in each sensor component. For this purpose, the sensor components are exposed in a defined manner to physical variables and disturbance variables which act the same for calibration in a test bench, and the electrical measured variable acquired in each case is accordingly assigned to the acting physical variables and disturbance variables. This results in training data sets for training the calibration model with the corresponding value combinations of the disturbance variables and, if applicable, the electrical measured variable and the assigned desired sensor variable.

Each of the sensor components can be trained individually so that optimal calibration parameters can be determined during operation of the sensor component despite the complex influences of disturbance variables. By implementing the data-based calibration model in the sensor component, the calibration parameters can be adapted as the operating situation changes with respect to the disturbance variables.

According to a further aspect, a method for measuring a physical variable with a sensor component and for providing a corresponding sensor variable is provided, wherein the sensor component comprises a measuring transducer for providing an electrical measured variable that depends on the physical variable to which the sensor component is exposed, and at least one disturbance variable sensor for acquiring at least one disturbance variable, comprising the following steps:

- providing a data-based calibration model trained to map at least one disturbance variable to at least one calibration parameter;
- acquiring an electrical measured variable representing the physical variable to be measured and acquiring the at least one disturbance variable;
- using a data-based calibration model to determine at least one calibration parameter depending on the acquired at least one disturbance variable;
- applying a calibration function parameterized with the determined calibration parameters to the electrical measured variable to obtain the sensor variable.

According to a further aspect, a sensor component for measuring a physical variable is provided, comprising:

- a measuring transducer for providing an electrical measured variable that depends on the physical variable to which the sensor component is exposed,
- at least one disturbance variable sensor for acquiring at least one disturbance variable;
- a calibration model unit for providing a trained data-based calibration model trained to determine at least one calibration parameter depending on the acquired at least one disturbance variable;
- a calibration unit configured to apply a calibration function parameterized with the at least one calibration parameter to the electrical measured variable to provide the sensor variable.

Furthermore, the calibration model unit can be configured to

- acquire training data sets at a plurality of evaluation times during a calibration, with the respective steps of:
- receiving a desired sensor variable that is to represent the value of a physical variable currently acting on the sensor component,
- acquiring an electrical measured variable representing the physical variable and acquiring the at least one disturbance variable with the aid of the sensor component at the relevant evaluation time;
- train the data-based calibration model with the training data sets so that said model maps the at least one disturbance variable to the corresponding at least one calibration parameter.

It may be provided that the calibration model unit is configured to use, as a loss function for training the data-based calibration model, a difference between the desired sensor variable and the sensor variable.

BRIEF DESCRIPTION OF THE DRAWINGS

Embodiments are explained in more detail below with reference to the accompanying drawings. In the drawings.

DETAILED DESCRIPTION

Figure 1:
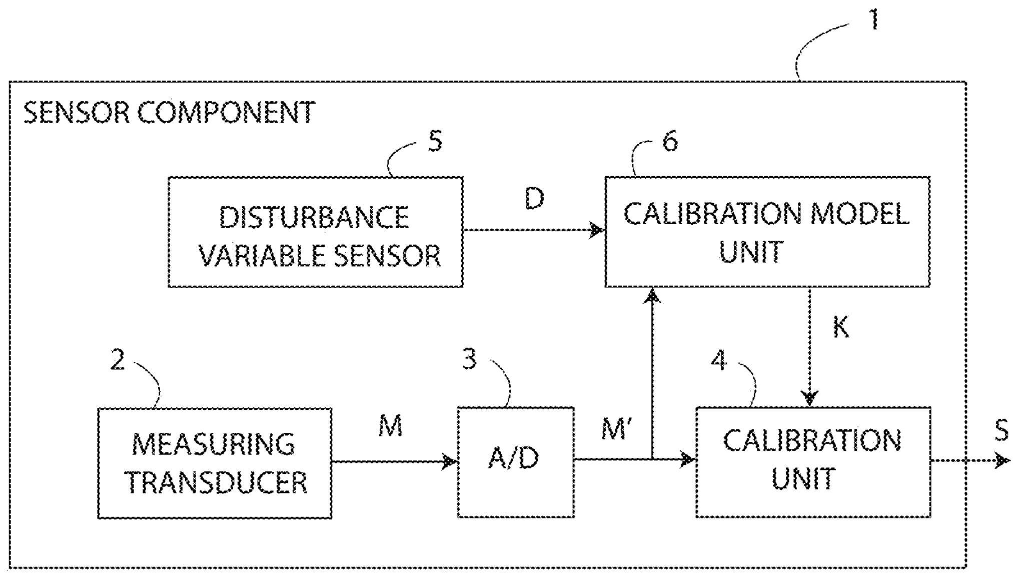
FIG. 1 shows a schematic representation of a sensor component.

FIG. 1 shows a schematic representation of a sensor component 1 with a measuring transducer 2 that acquires a physical variable and converts it into an electrical measured variable M. This measuring transducer 2 can, for example, comprise a vibrating mass for an acceleration or vibration sensor, at which a varying capacitance is measured on the basis of the deflection of the vibrating mass, or a vibration frequency is measured. A corresponding electrical measured variable M can be acquired by a corresponding capacitance measurement.

The physical variable may be any kind of measurable physical variable such as a temperature, an electromagnetic radiation, a magnetic field, a mechanical force, acceleration or rotation, a humidity, a pressure, a chemical content fraction of a gas, a heat quantity, a sound field variable, a brightness, a pH, an ionic strength, an electrochemical potential, or an electrical variable such as a current, a voltage, an electrical resistance, a capacitance, an inductance, a frequency, and the like.

The electrical measured variable M can be fed to an analog-to-digital converter 3 to provide the electrical measured variable M as a digitized measured variable M'. Alternatively, the electrical measured variable can also be further processed in analog form.

The digitized measured variable M' is fed to a calibration unit 4, which applies calibration parameters K to the electrical measured variable M to provide a sensor variable S at an output of the sensor component 1. The calibration parameters K can parameterize a calibration function and include, for example, a calibration factor for multiplicative application and a calibration offset for additive application. The calibration function can be part of a transfer function in the signal chain from the acquisition of the electrical measured variable M and the output of the sensor component 1. In particular, the calibration unit 4 uses a predetermined calibration function, in particular a linear calibration function.

Furthermore, one or more disturbance variable sensors 5 are provided for acquiring physical disturbance variables D which can affect the function of the measuring transducer 2 and/or the calibration unit 4. The disturbance variables D are different from the physical variable to be measured. For example, such disturbance variable sensors 5 can comprise one or more sensors for measuring a temperature, a magnetic field strength, an acting electromagnetic radiation, an effect of mechanical disturbances, such as acceleration effects and/or vibrations, an acting electric field, and the like. The disturbance variables D are selected as those variables which are in principle suitable for influencing the acquisition of the physical variable by the measuring transducer and the further processing of the electrical measured variable.

The sensor component 1 further comprises a calibration model unit 6 which applies a data-based calibration model to the measured disturbance variables D and, if applicable, to the measured variable M' in order to obtain calibration parameters K dependent thereon.

Figure 2:
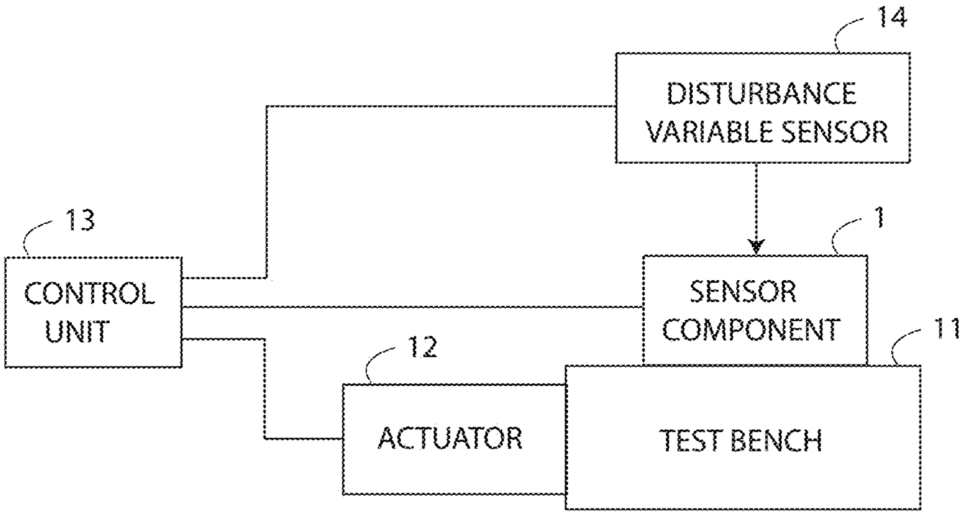
FIG. 2 shows a schematic representation of a test bench for calibrating the sensor component of FIG. 1.

FIG. 2 shows a calibration system 10 for calibrating a sensor component 1 of FIG. 1. The calibration system 10 has a test bench 11 via which the physical variable can act on the sensor component. For this purpose, the test bench 11 can be provided with actuators 12 or comparable devices in order to allow a physical variable to act on the sensor component 1 in a constant manner. When an acceleration sensor is the sensor component 1, the test bench 11 can, for example, be provided with electromechanical actuators which can exert a corresponding acceleration or rotation on the sensor component 1.

The test bench 11 is controlled by a control unit 13, which controls the actuators 12 and the test bench 11 to provide the physical variable to the sensor component 1 connected thereto. Furthermore, the sensor component 1 is connected to the control unit 13 so that the level of the physical variable acting on the sensor component 1 can be signaled to the sensor component 1 and measured there by the measuring transducer 2.

Therefore, an indication of the amount of the physical variable to be measured and the electrical measured variable M or the digitized measured variable M' acquired in the sensor component 1 based on the physical variable are present in the sensor component 1.

In addition, the sensor component 1 is subjected to varying disturbance variables D such as a magnetic field with varying field strength, a varying temperature, a varying vibration, a varying electric field, or the like. It is not necessary to provide the sensor component 1 with an amount for the relevant disturbance variable. However, the variation of the disturbance variables should cover a range corresponding to a range in which the disturbance variable can also lie in the field of application of the sensor component.

These disturbance variables D are selectively applied by the control unit 12 via the test bench to the sensor component 1 via suitable disturbance variable devices 14. The disturbance variable devices 14 can be designed to provide an electric field, a magnetic field, a temperature effect, a radiation effect, and the like.

Figure 3:
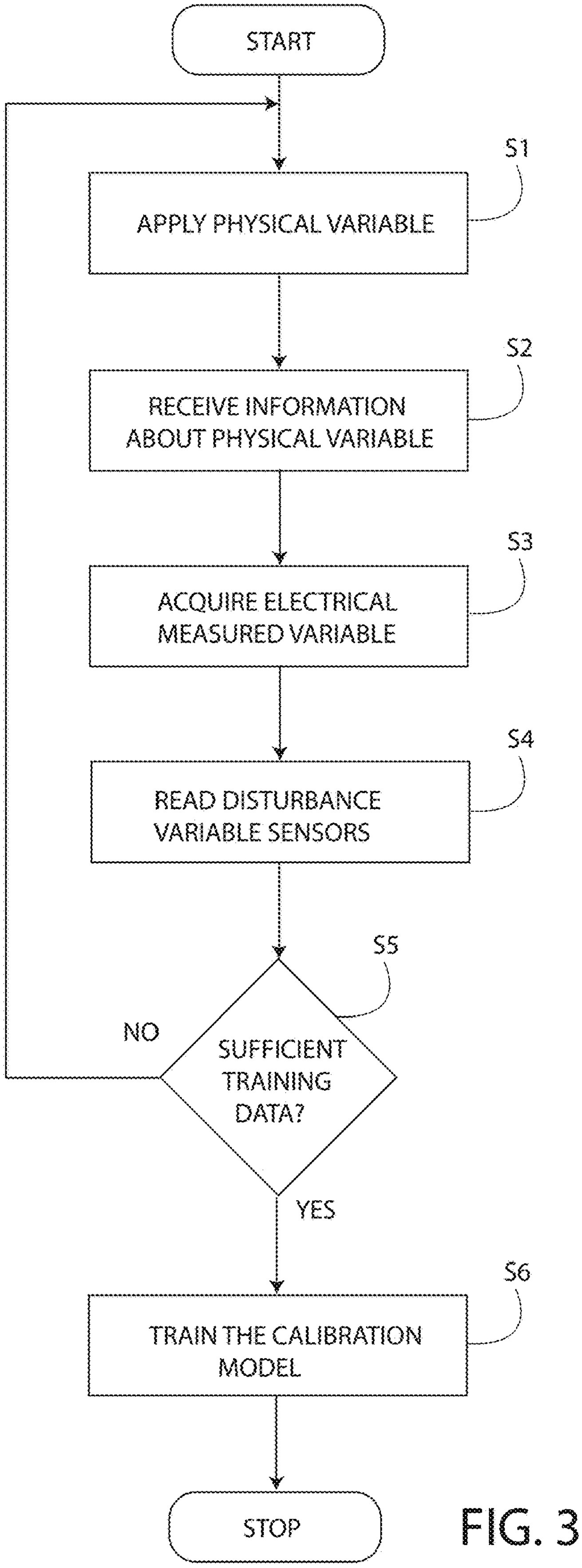
FIG. 3 shows a flow chart illustrating a method for calibrating a sensor component.

For calibration, a method is carried out in the sensor component 1 as described in more detail in the flow chart of FIG. 3. The method can be implemented in the sensor component in software and/or hardware. Furthermore, the sensor component 1 is connected to the control unit 13 of the calibration system 10.

In step S1, a physical variable to be measured is applied to the sensor component 1 with the aid of the calibration system 10.

In step S2, information about the physical variable to be measured, in particular its instantaneous value or its value at an evaluation time, is received in the sensor component 1 from the calibration system 10.

Furthermore, a desired sensor variable is provided by the calibration system 10, which specifies a value of the sensor variable which corresponds to the physical variable to be measured and is to be output when the physical variable to be measured is applied.

Furthermore, in step S3, an electrical measured variable M representing the physical variable is acquired in accordance with the physical measurement principle of the measuring transducer 2 at the time of evaluation. Therefore, the values acquired at the evaluation time for the physical variable, the desired sensor variable to be calibrated thereon and the acquired electrical measured variable are available in the sensor component 1 to be calibrated.

Furthermore in step S4, the disturbance variable sensors 5 are read and the level of the disturbance variable D acting on the sensor component 1 is accordingly determined for the specific evaluation time.

This results in a training data set for the particular evaluation time.

In step S5, it is checked whether sufficient training data sets have been acquired. This may be the case if a predetermined number of training data sets is exceeded. If this is the case (alternative: Yes), the method is continued with step S6. Otherwise (alternative: No), step S1 is revisited and a further training data set is acquired at a further evaluation time with a varied physical variable and/or varied disturbance variables D. The variations of the physical variable and the disturbance variables D are carried out in such a way that a range of values is mapped in a space-filling and dynamic-filling manner by the measurement points formed in this way.

In a subsequent training process, in step S6 the calibration model, which can be designed in particular as a neural network, as a probabilistic regression model or the like, is trained in a manner known per se.

Alternatively, a Bayesian neural network, a Gaussian process or a variational autoencoder can be used for the calibration model. These allow an intrinsic uncertainty in the prediction of the calibration parameters to be taken into account and, if necessary, to not be used for the calibration function if the uncertainty exceeds a threshold.

The data-based calibration model is trained with training data sets, each of which specifies the disturbance variables, the relevant value of the electrical measured variable M, and the desired sensor variable at a particular evaluation time. The calibration parameters are to shape the calibration function for each training data set in such a way that the desired sensor variable results from the electrical measured variable.

Training is performed using known training methods for data-based models using a loss function that indicates the quality of the data-based model. The loss function used herein can result from the deviation or difference between the desired sensor variable and the sensor variable determined by applying calibration parameters from the untrained or only partially trained calibration model, i.e., the calibration model in the current training state.

After training the calibration model, the calibration method is completed.

In one application of the sensor component, the electrical measured variable and the disturbance variables are applied to the input of the calibration model at each query time. From this, the trained calibration model determines calibration parameters, such as a calibration offset for zero point adjustment and a calibration factor to compensate for drift and, if necessary, further calibration parameters to take dynamic effects into account. In this way, suitable calibration parameters can be programmed in the calibration model for different system states of the sensor component determined by the disturbance variables.

The invention claimed is:

1. A method for controlling a device based on measuring a physical variable with a sensor component of the device and providing a sensor variable, the sensor component having (i) a measuring transducer configured to provide an electrical measured variable that depends on the physical variable to which the sensor component is exposed and (ii) at least one disturbance variable sensor configured to acquire at least one disturbance variable, the method comprising:

providing a data-based calibration model trained to map the at least one disturbance variable to at least one calibration parameter, the data-based calibration model receives only the at least one disturbance variable as an input and outputs the at least one calibration parameter;

acquiring the electrical measured variable representing the physical variable to be measured;

acquiring the at least one disturbance variable resulting from a disturbance imparted on the sensor component;

providing only the at least one disturbance variable as the input to the data-based calibration model to determine the at least one calibration parameter;

determining a parameterized calibration function by parameterizing a calibration function with the at least one calibration parameter from the data-based calibration model;

applying the electrical measured variable to the parameterized calibration function to obtain the sensor variable; and controlling the device based on the sensor variable without influence on an accuracy of the sensor variable from the disturbance imparted on the sensor component.

2. The method according to claim 1, wherein:

during a calibration of the sensor component:

acquiring training data sets at a plurality of evaluation times, the training data set at each respective evaluation time being acquired by:

applying the physical variable to the sensor component;

providing a desired sensor variable to represent a value of the physical variable being applied; and acquiring the electrical measured variable representing the physical variable and acquiring the at least one disturbance variable with the sensor component at the respective evaluation time; and training the data-based calibration model, with the training data sets, to map the at least one disturbance variable to the at least one calibration parameter.

3. The method according to claim 2, wherein the data-based calibration model is trained with a loss function indicating a difference between the desired sensor variable and the sensor variable resulting from applying the data-based calibration model to the electrical measured variable.

4. The method according to claim 1, wherein the at least one disturbance variable indicates one of a temperature, a magnetic field strength, an acting electromagnetic radiation, an acceleration effect of mechanical disturbances, vibrations of the mechanical disturbances, and an acting electric field.

5. The method according to claim 4, wherein the measuring transducer is a gyroscope, an acceleration sensor, a vibration sensor, and/or angular rate sensor.

6. The method according to claim 5, wherein the device is a vehicle and the sensor variable is used to for autonomously navigating the vehicle.

7. The method according to claim 1, wherein the data-based calibration model is formed with one of a neural network, a probabilistic regression model, a Bayesian neural network, and a variational autoencoder.

8. A device having a sensor component for measuring a physical variable, the sensor component comprising:

a measuring transducer configured to provide an electrical measured variable that depends on the physical variable to which the sensor component is exposed;

at least one disturbance variable sensor configured to acquire at least one disturbance variable resulting from a disturbance imparted on the sensor component;

a calibration model device including a data-based calibration model trained to output at least one calibration parameter in response to receiving only the at least one disturbance variable; and a calibration device configured to determine a parameterized calibration function by parameterizing a calibration function with the at least one calibration parameter and to apply the electrical measured variable to the parameterized calibration function to output a sensor variable from the parameterized calibration function, wherein the sensor variable is used to control the device without influence on an accuracy of the sensor variable from the disturbance imparted on the sensor component.

9. The device according to claim 8, wherein the calibration model device is configured to, during a calibration:

acquire training data sets at a plurality of evaluation times, the training data set at each respective evaluation time being acquired by:

receiving a desired sensor variable that represents a value of the physical variable currently acting on the sensor component; and acquiring an electrical measured variable representing the physical variable and acquiring the at least one disturbance variable with the sensor component at the respective evaluation time; and train the data-based calibration model, with the training data sets, to map the at least one disturbance variable to the at least one calibration parameter.

10. The device according to claim 9, wherein the calibration model device is configured to use, as a loss function for training the data-based calibration model, a difference between the desired sensor variable and the sensor variable.

11. The method according to claim 1, wherein the method is carried out by a computer program having program code that is run on a data processing device.

12. The method according to claim 11, wherein the computer program is stored on a non-transitory machine-readable storage medium.

* * * * *